(12) United States Patent
Colrain et al.

(10) Patent No.: US 9,600,371 B2
(45) Date of Patent: *Mar. 21, 2017

(54) PRESERVING SERVER-CLIENT SESSION CONTEXT

(75) Inventors: Carol L. Colrain, Redwood Shores, CA (US); Hochak Hung, San Carlos, CA (US); Kevin S. Neel, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 483 days.

This patent is subject to a terminal disclaimer.

(21) Appl. No.: 13/542,278

(22) Filed: Jul. 5, 2012

(65) Prior Publication Data

US 2013/0066952 A1    Mar. 14, 2013

Related U.S. Application Data

(63) Continuation-in-part of application No. 13/229,641, filed on Sep. 9, 2011, now Pat. No. 8,549,154, and a continuation-in-part of application No. 13/448,258, filed on Apr. 16, 2012, now Pat. No. 8,984,170, and a continuation-in-part of application No. 13/448,267, filed on Apr. 16, 2012, now Pat. No. 8,924,346.

(51) Int. Cl.
　　*G06F 17/30*　　(2006.01)
　　*G06F 11/14*　　(2006.01)

(52) U.S. Cl.
　　CPC ...... *G06F 11/1438* (2013.01); *G06F 2201/80* (2013.01)

(58) Field of Classification Search
　　USPC .................................................. 709/227, 238
　　See application file for complete search history.

(56) References Cited

U.S. PATENT DOCUMENTS

| 6,041,357 A | 3/2000 | Kunzelman |
| 6,442,552 B1 | 8/2002 | Frolund et al. |

(Continued)

OTHER PUBLICATIONS

U.S. Appl. No. 13/229,641, filed Sep. 9, 2011, Office Action, Nov. 26, 2012.

(Continued)

*Primary Examiner* — Kim Nguyen
(74) *Attorney, Agent, or Firm* — Hickman Palermo Bingham Becker LLP

(57) ABSTRACT

Methods, devices, and storage media are provided for preserving the context of a server-client session. A server generates an initial context and a context for each user command executed in a first session and sends context to a client with the return for each command. The context describes software, session state, returned data, and/or hardware characteristics of a server-side environment for the first session. The client receives and stores the context with each user command. Upon determining that the database session should be rebuilt in the second session, the client sends initial context. A server for the second session receives the initial context and determines whether commands should be replayed in the second session. If commands are replayed, the server validates that server environment and client-visible results for each command in the second session match that from execution in the first session using the context for that command.

42 Claims, 5 Drawing Sheets

(56) References Cited

U.S. PATENT DOCUMENTS

| | | | |
|---|---|---|---|
| 6,728,747 B1 * | 4/2004 | Jenkins | G06F 11/2028 707/999.01 |
| 7,536,462 B2 * | 5/2009 | Pandya | H04L 29/06 709/227 |
| 7,539,746 B2 | 5/2009 | Bankier et al. | |
| 7,552,218 B2 * | 6/2009 | Kaluskar | G06F 17/30575 709/227 |
| 7,631,107 B2 * | 12/2009 | Pandya | H04L 29/06 370/389 |
| 7,761,435 B2 * | 7/2010 | Stanev | G06F 9/461 707/705 |
| 7,849,173 B1 * | 12/2010 | Uhlik | H04L 12/14 709/223 |
| 7,849,177 B2 * | 12/2010 | Uhlik | H04L 12/14 709/223 |
| 7,853,698 B2 * | 12/2010 | Stanev | G06F 9/4435 709/227 |
| 8,005,966 B2 * | 8/2011 | Pandya | H04L 29/06 709/223 |
| 9,323,922 B2 | 4/2016 | Muralidharan | |
| 2003/0028654 A1 | 2/2003 | Abjanic et al. | |
| 2003/0131045 A1 | 7/2003 | McGee et al. | |
| 2003/0204769 A1 | 10/2003 | Coughlin | |
| 2005/0021514 A1 | 1/2005 | Barga et al. | |
| 2005/0038848 A1 | 2/2005 | Kaluskar | |
| 2006/0036617 A1 | 2/2006 | Bastawala | |
| 2006/0282422 A1 | 12/2006 | Al-Omari | |
| 2007/0067266 A1 | 3/2007 | Lomet | |
| 2007/0226218 A1 | 9/2007 | Chatterjee et al. | |
| 2008/0010240 A1 * | 1/2008 | Zait | G06F 17/30463 |
| 2008/0098048 A1 * | 4/2008 | Cao | G06F 17/30306 |
| 2008/0134219 A1 | 6/2008 | Dorrance et al. | |
| 2008/0228834 A1 | 9/2008 | Burchall et al. | |
| 2009/0077135 A1 | 3/2009 | Yalamanchi et al. | |
| 2010/0030818 A1 | 2/2010 | Cooper et al. | |
| 2010/0042601 A1 | 2/2010 | Kelley et al. | |
| 2010/0293137 A1 | 11/2010 | Zuckerman et al. | |
| 2010/0318394 A1 | 12/2010 | Nayak et al. | |
| 2011/0212783 A1 | 9/2011 | Dale | |
| 2011/0218981 A1 | 9/2011 | Retnakumari et al. | |
| 2012/0179645 A1 | 7/2012 | Lomet et al. | |
| 2013/0066837 A1 | 3/2013 | Colrain et al. | |
| 2013/0066948 A1 | 3/2013 | Colrain et al. | |
| 2013/0066949 A1 | 3/2013 | Colrain et al. | |
| 2013/0066952 A1 | 3/2013 | Colrain et al. | |
| 2013/0066955 A1 | 3/2013 | Neel et al. | |
| 2013/0297566 A1 | 11/2013 | Colrain | |
| 2014/0095547 A1 | 4/2014 | Guo et al. | |
| 2014/0229531 A1 | 8/2014 | Neel et al. | |
| 2015/0326673 A1 | 11/2015 | Neel et al. | |
| 2016/0321304 A9 | 11/2016 | Colrain et al. | |

OTHER PUBLICATIONS

U.S. Appl. No. 13/448,258, filed Apr. 16, 2012, Office Action, May 27, 2014.

U.S. Appl. No. 13/936,061, filed Jul. 5, 2013, Advisory Action, Sep. 4, 2015.

U.S. Appl. No. 14/231,347, filed Mar. 31, 2014, Office Action, Nov. 19, 2014.

U.S. Appl. No. 13/936,061, filed Jul. 5, 2013, Office Action, Dec. 12, 2014.

U.S. Appl. No. 13/448,258, filed Apr. 16, 2012, Notice of Allowance, Oct. 30, 2014.

U.S. Appl. No. 13/936,061, filed Jul. 5, 2013, Office Action, Mar. 25, 2014.

U.S. Appl. No. 12/562,984, filed Sep. 18, 2009, Notice of Allowance, Apr. 15, 2014.

U.S. Appl. No. 14/231,347, filed Mar. 31, 2014, Notice of Allownace, Mar. 17, 2015.

U.S. Appl. No. 14/748,451, filed Jun. 24, 2015, Notice of Allowance, mailing date Nov. 1, 2016.

U.S. Appl. No. 14/748,451, filed Jun. 24, 2015, office action, mailing date May 16, 2016.

* cited by examiner

FIG. 2

GENERATE ONE OR MORE CONTEXTS FOR ONE OR MORE COMMANDS EXECUTED IN FIRST SESSION 202

SEND THE ONE OR MORE CONTEXTS TO CLIENT 204

PRESERVING SERVER-CLIENT SESSION CONTEXT

CROSS-REFERENCE TO RELATED APPLICATIONS; BENEFIT CLAIM

This application claims the benefit as a Continuation-in-part of application Ser. No. 13/229,641, entitled "Recovering Stateful Read-Only Database Sessions," filed Sep. 9, 2011, the entire contents of which is hereby incorporated by reference as if fully set forth herein, under 35 U.S.C. §120; the application also claims the benefit as a Continuation-in-part of application Ser. No. 13/448,258, entitled "Idempotence for Database Transactions," filed Apr. 16, 2012, the entire contents of which is hereby incorporated by reference as if fully set forth herein, under 35 U.S.C. §120; the application also claims the benefit as a Continuation-in-part of application Ser. No. 13/448,267, entitled "Idempotence for Database Transactions," filed Apr. 16, 2012, the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

TECHNICAL FIELD

The technical field relates to executing commands in different server-side environments.

BACKGROUND

Servers and Clients

A server is a combination of integrated software components, such as one or more processes executing on one or more computing devices, and an allocation of computational resources, such as memory, storage, or processor cycles, for executing the integrated software components on a processor. A server or server instance may be one of several different server instances that are operating to provide services to clients. The server instances and other underlying server-side resources may differ from each other in hardware and/or software environments. For example, different server instances may have same or different versions of software installed, or may be operating with same or different software settings. As another example, a first server instance may have the same or different physical hardware installed, activated, or enabled. Other examples of different environments may include different optimizer settings, different language or currency settings, different storage formats, different endianness, different database states, or different underlying databases. These environment differences may affect how commands are executed by the different server instances.

Clients communicate with servers on server connections. In particular, clients send commands to servers, and the servers execute the commands and, optionally, send results back to the clients. As used herein, a server "operation" refers to a function, procedure, or other action taken by the server pursuant to executing commands sent by the client. A single command may trigger multiple server operations or may correspond to a single server operation. For example, some commands may request the server to return results in addition to performing a data manipulation function. Other commands may merely request confirmation that data manipulation commands were performed, or may not request any response. The server-side operations that are performed and/or the results that are returned may differ depending on the server-side environment.

A client may request execution of a set of commands that are specified in the request. In response, the server may execute the set of commands and confirm, to the client, that the set of commands were executed. For example, the server may provide results to the client or may merely provide an indication that the set of commands were executed. The connection between the server and the client may become unavailable at any time, planned or unplanned. For example, the server may fail, or a network device or other resource supporting the connection between the server and the client may fail. The client may not be finished using server-side services if the connection between the server and the client becomes unavailable before the server has responded to a set of commands. However, the client was not previously able to determine whether these commands had been completed. The client may also have more unsent commands for server(s) to perform even if the connection became unavailable after completing all outstanding sets of commands. The unsent commands may rely on information that was shared between the server and client as a result of the previous commands that were sent by the client. The client was not previously able to rely on any such shared information after a connection outage; the client is likely to be assigned to a different server instance after the outage.

Database servers and database applications are provided herein as examples of servers and clients, respectively. However, various techniques described herein may apply to any server-client system.

Database Instances

A database comprises data and metadata that is stored on one or more storage devices, such as a hard disk, a stick of random access memory, a cluster or a cloud storage system. Such data and metadata may be stored in a database logically, for example, according to relational and/or object-relational database constructs. A database application interacts with an instance of a database server ("database instance") by submitting, to the database instance, commands that cause the database instance to perform operations on data stored in a database. A database command is a request to access or modify data from a database. The command may cause the database instance to perform operations on the data in the database and/or return the data from the database. The database operations and/or the returned data may vary based on the hardware and/or software environment of the database and/or database instance.

In a multi-node database system, a database may be served by multiple database instances, and each database instance may be configured to access all or part of the database. Alternately, in a multiple database system, different databases may be able to serve the same work such that the database instances access different databases that can serve the same data or partitions of that data. The database instance may be operating as one of many different database servers in a database system, or the database instance may be operating in a cluster of many similar or even same database servers. Database instances may be grouped into logical domains called services. Multiple database instances may be installed or configured on a single machine or on separate machines. A database instance is a combination of integrated software components and an allocation of computational resources for accessing, modifying, or otherwise using a database.

The different database instances themselves may vary if they are different versions of software or same versions of software with different settings. Different machines running different instances may also have different hardware configurations, and the underlying databases of the different instances may also be in different states, in a different arrangement, or even holding different data. These different environments may affect the execution of database commands. For example, when both clustered and physical databases are restored back in time, the environments of the instances also change state.

Database commands may be submitted to a database instance in the form of database statements that conform to a database language supported by the database instance. One non-limiting example of a database language supported by many database instances is a Data Manipulation Language ("DML") called Structured Query Language ("SQL"), including proprietary forms of SQL supported by such database servers as Oracle®, (e.g. Oracle® Database 11 g). SQL data definition language ("DDL") instructions are issued to a database server to create or configure database objects, such as tables, views, or complex types. Although SQL is mentioned as one example, there are many other example database languages and exposed interfaces to the database, any of which may be used in conjunction with the techniques described herein.

Procedural Language/Structured Query Language ("PL/SQL") extends SQL by providing constructs found in procedural languages, resulting in a structural language that is more powerful than standard SQL. PL/SQL commands are organized into blocks of variable declarations, sub-commands that include procedural and SQL commands, and exception-handling commands. PL/SQL commands may be sent to a database server to cause the database server to perform a variety of actions as the PL/SQL commands are executed. The database server may also receive and execute Java-based commands, or commands that conform to other programming languages or constructs.

Multiple database commands may be sent from a database client to the database instance in a single request to perform work. The database commands may be processed by the database instance, and the database instance may return results to the database client in a single response to all commands that were submitted in the request. Handling multiple commands in a single roundtrip request and response may result in an efficient use of database connections. In other words, clients generally use database connections to submit requests less frequently when multiple commands are allowed to be submitted on the requests that use the database connections.

Applications and Logical Connections

Servers, such as mid-tier servers, provide database instance connections to applications that request information from a database. A mid-tier server is a server that provides access to one or more database servers, distributes work to one or more database servers, or manages connections to one or more database servers. An application is any logic running on one or more computing devices that uses a database connection to retrieve information from the database. The retrieved information may be presented or displayed to a user of the application. For example, the application may be accessed from a browser, where the application receives input from the user and presents information to the user. The application may be an application that is accessed through a web portal, over a network, by the user, an application that is installed on a machine of the user, or an application that is distributed among multiple machines.

In one example, an application issues a request to a mid-tier server for data from a database. The request may or may not be sent in response to user input. The mid-tier server selects a free connection from a connection pool of free connections to database instances. A database connection that has been selected and/or customized for use by a client or group of clients is referred to herein as a "database session." A database connection may be customized to meet particular needs as a database session for a particular client, or the connection may be generalized such that the connection can be used to support a variety of database sessions for a variety of clients. The mid-tier server sends the client request on the selected connection to a database instance, and the database instance accesses a database to handle the request. The database server processes the request by retrieving or modifying data in the database or by retrieving or modifying the data in a cache of data from the database. The database server establishes state for the database session as the database server processes the request. The server side state is not visible to or maintained by the client but is essential for correctness and performance as operations are executed. For example, this state can describe the schema to use, where the decimal point should be, and what plan the optimizer should use. The states can changes as SQL and PL/SQL in the session are executed.

Mid-tier servers often maintain connection pools, which include connections to database instances. The connection may refer to either a physical mechanism, such as a physical port, or a logical configuration, or both. There may be a one-to-one mapping of logical connections (i.e., database sessions) to physical connections. On the other hand, there may be more than one logical connection associated with a single physical connection. In one example, the free connections in the connection pool include only those connections that are not allocated to applications for processing requests. As work completes, connections are returned to the connection pool and are available for subsequent applications to borrow from the pool.

In one example, the mid-tier server assigns a logical connection to an application that is requesting access to the database. The logical connection is mapped, directly or indirectly, to one of a plurality of physical connections. The logical connection may be re-assigned to new physical connections without re-assigning a new logical connection to the application. The logical connection may be exposed to the application, and the application may continue to reference the same logical connection as the underlying physical connections change. In one example, a particular logical connection is represented as a connection object that is exposed to the application and that is mapped to another connection object, which may or may not be exposed to the application, and which may or may not be another logical connection. Through a hierarchy of logical connections, the particular logical connection is mapped to a physical connection.

Effect of Database Session Unavailability on the Application

As an application uses a database session to access a database, the application builds up state on the database session. For example, application uses the database session to obtain locks, create temporary variables or database objects, establish user-specific information, establish application-specific information, establish cursor information, create temporary arrangements or selections of data, and/or perform other partially completed operations on data for further processing in the database session. If the database session fails before the further processing occurs, the locks, temporary variables or database objects, user-specific information, application-specific information, language and nationalization settings, optimizer and performance settings, cursor information, temporary arrangements or selections of data, and/or the partially completed operations become unavailable to the application, even if the application attempts to reference this information in a new database session.

In one example, the database session may fail or otherwise becomes unavailable if a database instance upon which the database session depends fails or otherwise becomes unavailable. In most cases, failure of the database session causes the application to fail as the in-progress database session is lost. The application's user must restart the application or components of the application and start over with logging in, opening cursors and retrieving data, obtaining locks, creating temporary variables or database objects, establishing user-specific information, establishing application-specific information, establishing cursor information, creating temporary arrangements or selections of data, and/or partially completing operations on data for further processing in the database session. In one example, upon failure of the database session, the user may be left hanging with a blue screen or interrupted with an error message.

In prior client-server systems, if there is a break between the client and the server, the client sees an error message indicating that the communication failed. This error does not inform the client whether the submission executed any commit operations or if a procedural call, ran to completion executing all expected commits and session state changes or failed part way through or yet worse, is still running disconnected from the client.

If the client wanted to know whether the submission to the database was committed, the client could have added custom exception code to query the outcome for every possible commit point in the application. Given that a system can fail anywhere, this is impractical in general as the query must be specific to each submission. After an application is built and is in production, this is completely impractical. Moreover, a query cannot give an accurate answer because the transaction could commit immediately after that query executed. Indeed, following a communication failure, the server may still be running the submission not yet aware that the client has disconnected. For a PL/SQL or Java operation, or other procedure submitted to the database, there is no record for as to whether the procedural submission ran to completion or was aborted part way through. While it may have committed, subsequent work may not have been done for that procedure.

Even if the user could re-submit commands on a new database session, re-submitting the commands could have unexpected results due to the different environment of the new database session. Existing technologies do not provide a way to re-submit these commands in a new database session at all, let alone re-submitting the commands such that execution of the commands in the new database session achieves the expected results.

Even highly complex applications may expose outages to the end users or may fail when attempting to recover from an error. For example, a new database session may store data in a first format even though a user's application expects the data in a different format. Users experiencing resource outages may be frustrated and may lose revenue due to missed business opportunities, decisions made using bad data, troubleshooting expenses, and lost time in restarting the application or redoing the work. In another example, once the database session has failed, the user may be prevented from entering any information or causing any commands to be submitted to the database before the page is reloaded. Also, reloading the page without checking what data was stored to the database could lead to a duplicate submission. The application may prevent the user from submitting any commands that depend on the state that was lost in the failed database session or may misbehave if the application relies on information that is no longer available. In a particular example, fields already presented to the user may be grayed to indicate that, in order to avoid corrupting data stored in the database, the fields can no longer be modified by the application.

Even if the database session fails over to a second database instance, the second database instance may not have any information about the database session beyond what was committed to the database prior to the failure. In order to avoid corrupting the data in the database, applications may reset the information that is displayed to the user to information that matches the data already committed to the database. In other words, when a database instance fails, a user may lose temporary information that would have been available to the user just prior to the failure. Some of the lost information may correspond to information that was being displayed, modified, selected, or arranged by the application and/or user that was using a now unavailable database session, or information that was about to be returned to the application and/or user on the now unavailable database session. The user is often forced to re-enter fields of data again.

The loss of information already entered, modified, selected, and/or arranged by a user may result in user frustration and wasted time in re-entry, re-modification, re-selection, and/or re-arrangement of the information after the application or application component has restarted. The lost information may be information that was retrieved by the user from others, for example, by video, voice, email, or text message. In some cases, the lost information may no longer be retrievable. Losing information can be particularly costly when the user is being assisted by a support service provider as the failure occurs. Loss of information may require further communications with the support service provider, or may even cause the user to lose faith in the reliability of the application, the mid-tier server, or the database server, or the company that provides the application, the mid-tier server, and/or the database server. Further, the user may be selecting, entering, or modifying time-sensitive information prior to failure. Requiring the user to re-enter the time-sensitive information after the failure may result in a delay that causes loss of business, value, or reputation of the user to business clients or business ventures of the user. Requiring re-entry may also result in a loss of opportunity for the user. For example, the user may miss out on items or opportunities that the user had previously selected.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 illustrates an example server-side process for generating context and sending the context to a client.

DETAILED DESCRIPTION

Figure 1:
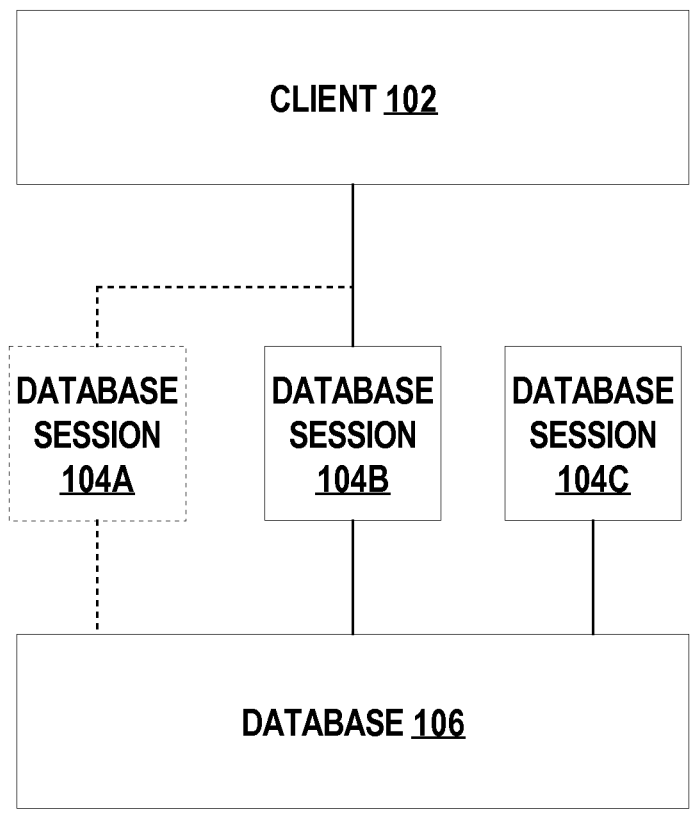
FIG. 1 illustrates an example configuration where a client accesses a database in a database session.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are disclosed herein for preserving the context of a server-client session. The preserved context may be used for determining compatibility of command(s) played on the server-client session with a different server-client session having a different context. For example, commands may have been previously attempted in a first session, and a server hosting a second session may wish to evaluate whether the commands, if executed in the second session, would likely produce a same client visible result and/or session settings as the commands should have produced if executed to completion in the first session. Although the techniques may be described with reference to specific embodiments, the functionality described herein may be provided by the performance of a method, by a set of one or more stored instructions that, when executed, cause performance of the method, or by a set of one or more machines specially configured to perform the method.

In one embodiment, session context is preserved at the client such that the session context is available for any session that is used by the client. For example, a client may send commands and receive results on a session. In addition to the results of the commands, a server may also generate and send, to the client, a context of the session. The context of the session describes a server-side hardware and/or software environment of the session. Servers may differ from each other in hardware and/or software environments. The context includes items of server-side environment information that describe a server-side environment. An item of server-side environment information may describe a version of hardware or software that is installed on the server; a hardware or software setting used by the server, such as an optimizer, language, format, or currency setting used by the server; a storage or transmission format used by the server or by an underlying database, such as an endianness of server storage; a state of data stored on the server or on an underlying database; and/or a type of server or underlying database; and/or any other characteristics of the server, a database, and/or other resources that are being used to execute commands in the session. Different sessions may have different contexts, and there are potentially limitless varieties of contexts.

In various examples, the context may indicate one or more of: an identity of an underlying database of the first session, a type of the underlying database hardware or software (i.e., hardware or software that meets certain characteristics), characteristics of other supporting hardware or software such as processor time or memory, and/or a logical state or time of the underlying database of the first session; ports and/or versions that are used for the first session; the endianness or other storage format characteristics for the first session; the settings of the session built up as the SQL and PL/SQL executes such as formats, language, and nationalization, the security credentials that are used to detect and prevent tampering in the first session; a sequence of commands that were executed in the first session; how to determine whether or not a last transaction that was submitted in the first session was committed in the first session.

In one example, the context may indicate how to determine whether any of logical transactions, remote transactions, distributed transactions, parallel transactions, replicated transactions, XA transactions, a set of commands that includes Data Definition Language (DDL), and/or a set of commands that includes Data Command Language (DCL) were committed in the first session. The context may be used in combination with information stored in server-side storage to determine a transaction's outcome in a deterministic manner even if the transaction is in-flight and has not completed or rolled back in the first session.

The context may also be used to support correct reconstruction of transactional or non-transactional state that was built up on the first session, for example, by replaying command(s) that were originally executed in the first session. As used herein, non-transactional session state includes state that is built up by commands that do not access the database but rather create a session environment that supports the commands that do access the database. If the non-transactional state is correct, the correct data is returned to the client and recorded to the database—for example, in terms of collating sequences and formats. The non-transactional state includes variables maintained at the server to facilitate processing and performance settings to direct the SQL execution plans. The non-transactional state must be correct to support the logical correctness of the application for SQL results returned to the client and data persisted to the database. For example, an application may expect a certain timezone, date format, decimal point position or degrees of parallel operation, a set of global variables or other settings. A correct non-transactional state supports the original and a replayed execution. Correct here does not necessarily mean the same as the original, it means it is consistent for the delayed execution.

Transactional session state is built up by commands that may commit changes to the database or otherwise modify the state of the database to an unpredictable state if duplicated. If the outcome of a transaction is known and uncommitted, a transactional set of commands may be safely committed. If the outcome of a transaction is known and committed, the transaction may be rolled back and committed again. If the outcome of a transaction is unknown or partially committed, the server may be able to roll back part of the transaction in the second session if different parts of the transaction can be logically separated. However, a transaction might be inseparable yet partially committed, in which case the transaction cannot be completed in the second session. Information that identifies previously submitted transactions may be included within the context such that a server in the second session may determine how to proceed for the previously submitted transactions.

In the same or a different example, the context may include a checksum of the client-visible results of executing commands in the first session. This checksum may include any results that were returned to the client from the server to the client in the first session, whether or not the results are actually used or displayed in a client-side application. The context may include a checksum of results as well as out binds, messages, and message texts.

In the same or a different example, the context may include original values that were returned from function calls in the first session.

In the same or a different example, the context may include versions of data against which commands were executed in the first session. Version data for large data such as video is more effectively checked using version than checksums. Similarly, rows may be checked using row versions on disk.

In the same or a different example, the context may include a database signature comprising a database identifier (DBID), a database incarnation (DBINC), and/or a timestamp for an underlying database used in the first session. The DB incarnation is the (system change number (SCN), timestamp) pair where the SCN is the reset log SCN and the timestamp is the reset log counter. Timestamp is used to distinguish between "duplicate" SCNs from different incarnations. This information may help the server make decisions on whether to accept or reject replay and whether to use the original or current SCN during replay. The context may also include a signature for a database plugged into a consolidated database such that the contacts hold a pair comprising the signature of the root database and the signature of the plugged in database, where each signature may contain a DBID, open SCN and open timestamp.

In the same or a different example, the context may include an ownership, transaction signature, and/or a call order of command(s) executed in the first session. These data can be used to prevent tampering by stealing the contexts, and protocol bugs such as executing in the wrong session.

In the same or a different example, the context may include a logical commit number or system change number (SCN) of command(s) executed in the first session. Keeping an SCN supports resubmitting a single call or the entire request at an earlier time than the current database.

In the same or a different example, the context may include a checksum of all client-visible results in the first session.

In the same or a different example, the context may include an output for selected function calls in the first session. The context may include the original results of function calls that executed at the server such as date, timestamp, random, GUIDs and sequence values. Keeping such original values improves the likelihood that a replayed execution will produce the same client visible results and same server settings as the original execution.

In the same or a different example, the context may include DBID-Object-ID-LOB version tuples for large objects (LOBs), binary large objects (BLOBs), and/or character large objects (CLOBs), and/or DBID-Rowid-Row version tuples for rows.

In the same or a different example, the context may specify an optimizer execution plan that preserves an output order of commands in the first session.

In one embodiment, a client holds, or stores in memory, command(s) of a set of commands that were sent for execution in the server-client session. The client also holds item(s) of server-side environment information, or context, for the session. The client may send the held command(s) and/or item(s) of information in another session that may be different from the session for which the command(s) and item(s) of information are stored. Before and/or after receiving the held command(s) and/or item(s) of information, the other session may differ from the initial session with respect to at least one of the item(s) of environment information. The other session may be modifiable such that different item(s) of environment information can be made compatible with the corresponding item(s) of environment information from the initial session.

In one example, the commands held by the client are received from the application and the context corresponding to each command is received from a server in the initial server-client session. For example, for each command issued by the application, the context may be received by the client along with or appended to results that are sent to the client in response to execution of the commands in the first session. In another example, the commands issued by the application are held by the client, and only the context or updates to existing context are received from the server by the client in response to execution of the commands. Each held command with its associated context is sent to another server in another server-client session to determine the compatibility of a server-side environment of the other server-client session as that second session is reconstructed. The command(s) and associated context(s) may be held on the client and sent to the other server-client session as each command(s) is re-executed, where each command(s) is re-executed and then the context(s) for each command(s) is used to ensure that the execution is the same as the initial server-client session. In one embodiment, the contexts are not modified by the client between receiving the commands and context in the first session and sending the commands each with the associated context to the second session. In this embodiment, the client need not be aware of the contents of the information that is received in the first session and sent in the second session, so long as a server in the first session specifies the information in a manner that can be stored on the client and in a manner that is expected by a server in the second session.

In one embodiment, the client detects unavailability of a first server-client session and sends the command(s) each with matching context in a second session in response to detecting the unavailability of the first session. A second server hosting the second session may determine the compatibility of the server-side environment of the second session to execute a command using the context of the first session. If the server-side environment of the second session is compatible, or can be modified to be compatible, with the context of the first session, then state may be rebuilt on the second session. This progresses as each command is executed on the second session according to the context. If the server-side environments are compatible, the client may receive, from a server in the second session, an indication that the command under that context was successfully completed in the second session. The client may continue sending command/context pairs to execute in the second session. After each pair, client may receive a message that includes results of commands that were executed in the second session.

If server-side environments are incompatible, or cannot be modified to be compatible, the client may receive, from a server in the second session, an indication that the last command issued could not be successfully completed in the second session. For example, the client may receive an error message in the second session. In one embodiment, the error message may indicate that another server-side environment may be compatible or may be modifiable such that the other server-side environment is compatible. In response to the error message, the client may retry execution of the commands on another database and session. On reconnecting, the client or a connected server may reconnect to another server that is more likely to be compatible.

In another embodiment, the first session may have received no commands from the application when the server unavailability is detected. In this case, the context from the authentication if the first usage or from the last check-in, if a connection pool, is sent to the second session to determine the compatibility of the second session.

In one embodiment, a server receives, from a client in a first session, command(s) for execution in the first session. The server sends context to the client in the first session, one context for authentication and one (or more) context for each command or set of commands. For example, the context may be sent to the client in response to executing each command or when the session is set up or authenticated for the client. An example technique for sending the context in response to executing commands includes piggybacking or appending the context on a message that reports results of each command to the client. The client holds the context(s) with each command and uses the context(s) so that another server can determine whether another session is compatible to execute the associated command for the client and whether that execution was then valid.

In one embodiment, another server receives, from the client on a second session, initial context information that describes the first session and then, for each command, command context that describes that command that previously sent by the client for execution in the first session. In response to receiving the context information, the other server determines whether or not the other server is compatible with the context information that describes the first session for that command. If the environment of the other server is compatible or can be modified to be compatible with the first session, then the other server may execute the command associated with that context as optionally modified. On successful execution of each command/context pairs the other server may also indicate, to the client on the second session, that the first session was safely restored on the second session. When all commands have been processed further commands can now be executed on the second session, and the server will return contexts for each of these in case the client attempts to recover again due to a further outage.

In another example, if the environment of the other server is incompatible or cannot be modified to be compatible with the first session based on information received in the context for a command or after execution the checksum for that execution does not match the original, then the other server may indicate, to the client in the second session, that the first session cannot be safely restored on the second session. For example, the other server may send, to the client, an error message that indicates the last command could not be executed on the second session and that the session cannot be restored on the second server.

In one embodiment, even if the second session is compatible with the first session and it appears, to a server of the second session, that commands can safely be replayed in the second session, verification logic on either the server of the second session or the client verifies that client-visible results of executing each command in the first session match client-visible results of executing same command in the second session. In other words, for commands in which results were previously returned or otherwise provided to the client in the first session, the verification logic determines whether the results or information otherwise made available by execution of each command in the second session matches the results or information otherwise made available by the same command in the first session. In one example, the verification logic determines whether the results match by comparing a first checksum of the client-visible results of a command in the first session with a second checksum of the client-visible results of the same command in the second session for each command/context pair submitted to the second session. If the results of a command does not match that on the second server, then the server of the second session may indicate, to the client, that the first session cannot be safely restored on the second session. In other words, the client cannot safely continue to execute commands in the second session as if the client were continuing to use the first session in an uninterrupted manner. If the client were to execute further commands in the second session even though the results do not match, the client would be in danger of incorrectly relying on client-visible information that was made available during the first session.

FIG. 1 illustrates an example configuration where a client accesses a database in a database session. As shown, client 102 accesses database 106 using database session 104A. Client may execute various commands in database session 104A according to server-side contexts of session 104A. While client 102 is using database session 104A, database session 104A may become unavailable to client 102. Client 102 may then use database session 104B to execute commands. In one example, client 102 checks to see if the server-side context of session 104B is compatible with or can be modified to be compatible with the server-side context of session 104A and then for each command again checks the context for that command against session 104B. For each command, if 104B is compatible, each command originally sent for execution in session 104A may be replayed in session 104B in an attempt to rebuild state from session 104A in session 104B.

FIG. 2 illustrates an example server-side process for generating context and sending the context to a client for each command issued to the server. In step 202, a server may generate context for a command or a set of one or more commands executed in a first session. For example, the context may describe hardware or software characteristics of a server-side environment of the first session before and after that command executes. In step 204, the server sends the context to the client with the results of that command.

Figure 3:
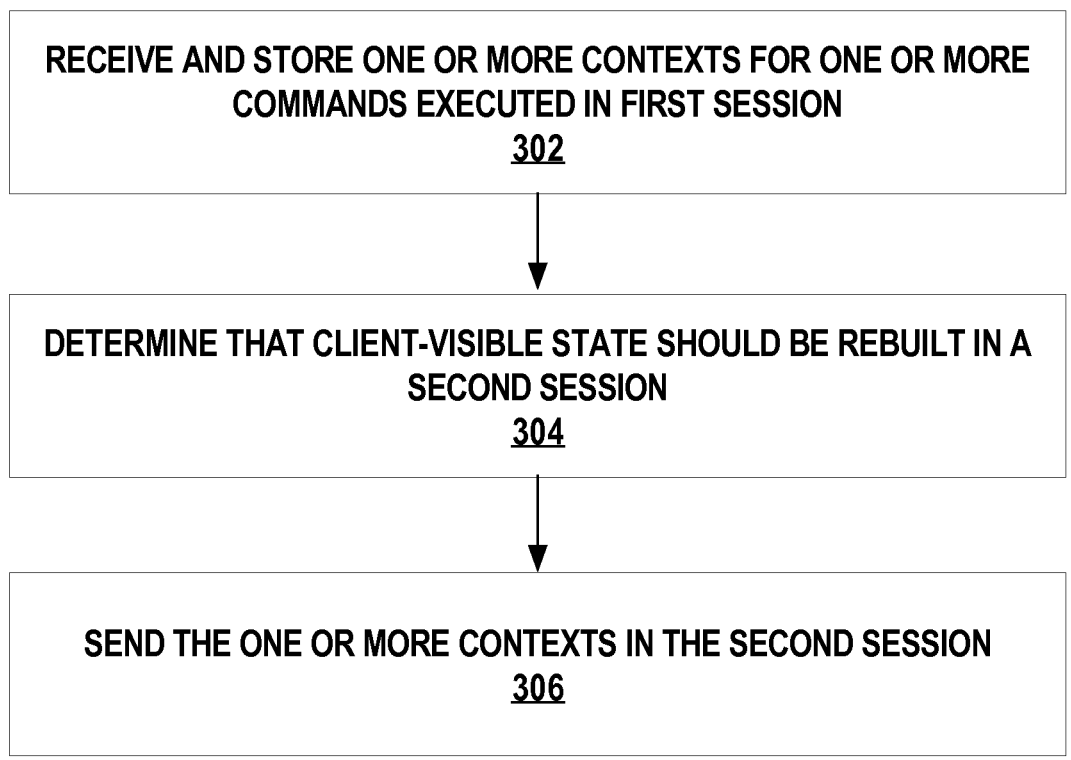
FIG. 3 illustrates an example client-side process for receiving and storing context that describes a first session, and sending the context in a second session.

That is a conversation progresses, each command or set of commands may have its own context rather than having one context for all of the commands. FIG. 3 illustrates an example client-side process for receiving and storing a context for each command that describes a first session before and after executing that command, and sending the context in a second session, that the database, security, and the environment settings are compatible, plus the capabilities allowed at the second session. In one embodiment, step 302 is executed on the client-side in response to server-side step 204. In step 302, a client receives and stores context for each command and or for each set of commands executed in a first session. In step 304, the client determines, detects, or is informed that client-visible state should be rebuilt in a second session. For example, the client may detect that the first session has become unavailable to the client. In response to step 304, the client may send the context in a second session such that the state of the first session may be rebuilt and then validated on the second session for the command that the context pertains.

Figure 4:
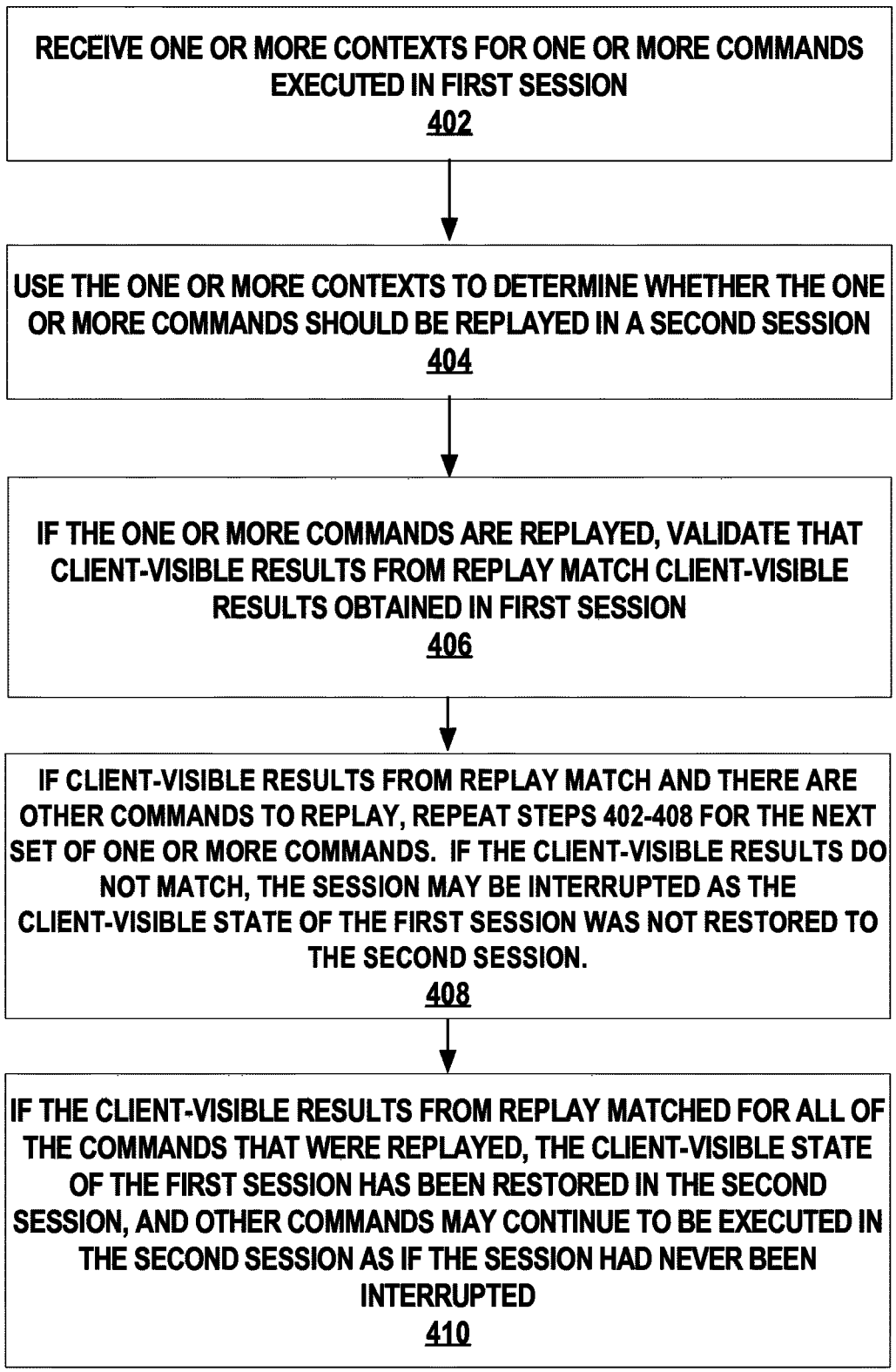
FIG. 4 illustrates an example server-side process for using a context that describes a first session to determine whether commands should be replayed in a second session.

FIG. 4 illustrates an example server-side process for using a context that describes a first session to determine whether a command should be replayed in a second session. In one embodiment, step 402 is executed on the server-side in response to client-side step 306. In step 402, a server, which may be a different server than the server performing the steps in FIG. 2, receives a context for each command executed in a first session. For each command/context pair, the server uses the context in step 404 to determine whether the command should be replayed in a second session and if replayed whether that replay is valid. If any command should not be replayed, the server may indicate, to the client, that the second session is not compatible to replay the command in this case, the commands may be attempted on a third session each with their own context, or the state that was built up on the first session may be lost. If a replay is rejected because data has changed, then the replay is cancelled and the original error is returned. For each command that is replayed, validation logic, recorded in the context for that command is compared with that for the re-execution, in step 406, such client-visible results from replay match client-visible results that were obtained in the first session. The client-visible results that were obtained in the first session are recorded in the context that describes that command the first session. In step 408, if client-visible results from replay match and there are other commands to replay, steps 402-408 are repeated for the next set of one or more commands. If the client-visible results do not match, the session may be interrupted as the client-visible state of the first session was not restored to the second session. This process continues as the first session resubmits each command and context in the second session. After all commands are resubmitted and validated, further commands may continue to be executed, in step 410, in the second session as if the session had never been interrupted. In other words, the client or application need not be aware that, going forward, commands are being executed in the second session instead of the first session. If the client-visible results do not match or the session settings do not match, then the server state has not been successfully restored to the second session. In this case, the commands may be attempted on a third session, or the state that was built up on the first session may be lost.

Preserving the Replay Context

Various examples of replay context are provided in the general overview, and the term "replay context" is generic with respect to all of these examples. In one embodiment, the replay context is an opaque context area that is returned to the client driver during normal, application runtime. The replay context may be returned from the server with each call. If the replay context may be completely opaque to the client driver, to the mid-tier, and to the application if generation of the replay context and processing of the replay context is handled on the server-side. The replay context carries the knowledge to validate the security, compatibility, validity, correctness or fidelity of replay, and/or to optimize the replay. For example, the replay context may contain mutable values that were used for original function executions, the checksum for data exposed to the application, a protocol checksum for security and protocol validation, settings for the session or a hash of these, keys for transactional result sets, and the optimizers' execution plan. In one embodiment, the cursor replay context contains the scn for commands that were sent in the session, the checksum and the protocol checksum.

In one embodiment, the context uses a universal format that is readable by a variety of servers with a variety of server-side environments. For example, the replay context may use a universal format to handle endian, version, port changes and algorithm changes between original and failover target.

The replay context may include any information that supports replay/migration of in-flight work. In one embodiment, the replay context includes a database signature that indicates the relative point in time of the database at the time that the original call executed (database identifier (DBID), database incarnation (DBINC), Timestamp). In one embodiment, the database signature (DBID, DBINC, Timestamp) is used during replay to determine whether the session is being re-established and the request is being replayed in advance or behind, relative to the previous replay. The database may have advanced since the original execution, and replay can proceed with optimizations such as playing the executed portion at the original scn. If however, the replay is at a different logical database, the request may be able to be replayed at the current time for this database. For a consolidated database, the replay context may also include a pair of database signatures—one for the root of the consolidated database and one for the plugged in database. Both must be the same of descendants of the original execution for replay to be validated.

In the same or a different embodiment, the replay context includes ownership, transaction signature, and call order to ensure that the replay is not tampered with and no protocol violations have occurred—bugs or intentional. In one embodiment, for transactions, transaction keys are used during replay to determine the outcome of that transaction, and to ensure that all parts belong to the same transaction and are in correct order. A conversation may have spanned a number of instances while recovering, and the replay may include segments of the same transaction from different instances. In one embodiment, the context protects the linkage of segments, and also prevents replay if there is a gap in the transaction sequence from a client.

In the same or a different embodiment, the replay context includes a system commit number (SCN) of commands that were executed in the session to optimize replay when browsing at original database time. In one embodiment, the system change number is used as an optimization whenever possible to replay browsing (SELECT). For SELECT statements, before starting current-mode execution (time now), a conversation of SELECT statements may, for example, be re-executed at the original SCNs, when using the same logical database. This may improve the likelihood that the returned data is the same as the returned data during the original execution.

In the same or a different embodiment, the replay context includes a checksum of all visible results that were sent to the client in the session, to offload checksum calculation from the client-drivers, and to provide immediate server-side rejection at mismatch at replay. The server may use hardware-based calculations or software-based calculations to compute the checksum. The checksum calculations may be compatible with various types of server-side environments to support failover and migration. In one embodiment, the checksum is used to verify that the outcome from the call execution is the same as the original execution. The checksum may support all call types including SELECT, SELECT FOR UPDATE, DML, DML RETURNING statements, ERROR TEXT and ERROR CODES, and for PL/SQL output bind variables and PL/SQL function results. At replay, if there is a mismatch between the checksum for user visible output for original and replay, an error is returned to the client session reporting replay rejection. As a result of the error, the state built up on the session may be aborted, or a different server may attempt to restore the state on a different session in a different server-side environment.

In the same or a different embodiment, the replay context includes an output for selected function calls to provide opaque bind-variable consistency (termed mutable support). Support for mutable function output is provided because client drivers do not typically parse and substitute bind variables. If a function's return value is cached in the replay context with the matching call at the client, this value may be used with that SQL and PL/SQL when it is replayed. At replay, the original values are returned from the replay context when the function calls are called so that mismatch is not possible when the values are again used in the bind variables, calculations, or input parameters that might follow the function call. For example, if the original value returned from a seq.nextval function call is 17, at replay the same value of 17 is returned from the server. The server uses the replay context rather than re-executing the function to preserve the referential integrity. In one embodiment, for mutable values, when the session calls the function, the function code replaces the normal function execution with the value saved in the replay context. While the replay context holds values, the original values are returned in place of executing the function. Replacing the original values provides BIND variable consistency for primary/foreign key relationships that would otherwise be violated. In one embodiment, the mutable values in the replay context are applied only when permissions are set to do so at runtime and at replay.

In the same or a different embodiment, the replay context includes a DBID-Object-ID-LOB version tuples to provide detection of LOB/BLOB/CLOB and Secure file changes (media types). These version tuples may replace checksums that could alternatively be computed on the potentially large LOB/BLOB/CLOB objects. In one embodiment, for LOB, BLOB, BLOB and Secure file data types that can be huge (in gigabytes range), calculating a checksum on the entire set of data may be avoided during runtime, which may save time that may have otherwise been used re-streaming the data. Instead the object incarnation may be used during replay to determine whether the object changed between initial request and replayed request. The tuple (LOB Object ID, LOB incarnation) uniquely identifies a LOB incarnation. In one embodiment, replay is rejected in case of mismatch of either field.

In the same or a different embodiment, the replay context includes a DBID-Rowid-Row version tuples to provide opaque optimistic locking in transaction replay. In one embodiment, with row versions enabled, the original DML can return rowid/row version pairs in the replay context. At replay, the DML driver can check that the session is in replay and has passed back the cursor replay context containing the rowid/row version pairs that match. The replay context provides the mechanism to save and return the keys that are used for protecting transaction replay.

In the same or a different embodiment, the replay context includes an optimizer execution plan to safeguard output order for SELECT replay when ORDER BY is not part of the original SQL statement.

In one embodiment, the replay context is piggy backed on messages that are returned by the server from each return trip between the client and the server. The replay context contains sufficient knowledge to protect, direct, and/or validate replay of the last call passed to the server, if that call is to be replayed. The client driver receives and saves the replay context with each call buffered at the client. When that call is no longer needed for replaying the session, the replay context associated with that call is discarded along with the call itself.

In one embodiment, the replay context is extensible to accommodate additional protection and validation checks with no change to the client driver or application. The power of the replay may be increased as new knowledge and checks are embedded in the replay context.

In one embodiment, the replay context is completely self-contained. The replay context may include the security information, database signature, function outputs (called mutable), checksum of client-visible results, transaction keys, a hash of the environment and SQL statement, and placement of that call relative to others. In another embodiment, one or more components are maintained separately from the replay context. For example, the client may maintain a checksum of the client-visible results. These other components may be combined with or passed with the replay context when the replay context is sent on a new session.

In one embodiment, no additional storage is required to store the replay context. The replay context may be stored with the call that is already in the memory on the client.

In one embodiment, the replay context is held at the client driver only as long as the call may be used for replay. If the call may be represented by data that is already committed to the database, if the client expressly indicates that the call is no longer relevant, and/or if the call is beyond a threshold age, the call and the associated replay context may be discarded from memory.

In one embodiment, the replay context may be applied to any current database replicate supporting the same data and service as the original database instance. The client driver may reconnect and pass the context to the new database instance to support the replay. The client may reconnect to the same database, a DR site, a readable replicate, or a logical replicate.

In one embodiment, at replay, the replay context is returned to the server from the client driver with each replayed call. The server uses the information captured at runtime for security, protocol checks, fidelity of the replay, and optimizations that improve the chance of a successful replay. If the session is being replayed and a replay context is provided, the original values are substituted for the function calls, row versions are checked by the data manipulation language (DML) driver, and checksums are checked by the structured query language (SQL) layer.

In one embodiment, security credentials, two-task common (TTC) sequence (a protocol used by the client to communicate with the server), session environment, and transaction keys are verified to ensure that the replay is valid. Since replay is from a client, the server may execute checks to ensure that the client has not been spoofed, or that the client does not have a bug and/or is not executing an invalid replay.

In one embodiment, the cursor replay context is only captured when using clients that are capable of replay and the commit_outcome attribute (idempotence) is enabled for that session. These are example connect-time settings.

Recovering an In-Flight Database Session Using Preserved Context

Previously, in-flight sessions could not be recovered and migrated to new sessions such that the outage is masked from the end user. Following an outage, planned or unplanned, the state of the browser, the state of the application session, and the state of the client driver session are positioned at the current time even if the state of the database session has been lost. If the database session was not lost, the database session may be intact with lock(s) and transaction(s) in progress, but the database session may appear to the client to be lost due to a loss of connectivity or a timeout.

Following an outage, the client may have entered work and submitted the work to the server. The state at the client remains at present time, potentially with entered data, returned data, and variables cached. If the client obtains a new session, the new session will not initially have any of the non-transactional session state that existed as a result of the client executing work in the initial session. If a transaction was started by the client in the first session, then, if any part of the transaction committed, the committed portions of the transaction are rolled back such that the transaction may be replayed in the second session. If the transaction has not yet committed, the transaction may be replayed and committed.

Replaying commands on a second session to re-establish the state of the first session is potentially an expensive process in terms of time and computing resources. In order to avoid performing this process when the process is not likely to be productive, in one embodiment, a server of the second session first determines whether the server-side environment of the second session is compatible with the server-side environment of the first session. The server of the second session receives a context that describes the server-side environment of the first session, and compares this context with the known context of the server-side environment of the second session. If the server-side environments are compatible or can be modified to be compatible, then the server of the second session may proceed with replaying commands in an attempt to re-establish the state of the first session in the second session. If the server-side environments are compatible, the server of the second session may change server-side environment settings in an attempt to improve the likelihood that replay in the second session produces the same client-visible results as the initial execution in the first session. If the server-side environments are incompatible or cannot be modified to be compatible, then the server of the second session can save time by reporting to the client that the state of the first session cannot be safely re-established in the second session.

In the process of replaying commands, for each command the information in the replay context is first used to check that the environment and protocol for the server are correct in the the second session. If valid, the command is executed and the server of the second session may generate a checksum of the client visible data for the execution in the second session. Using the checksum saved in the replay context from the first session for that call, the second session may verify that the client-visible of replaying commands in the second session match the client-visible of playing commands in the first session.

In one embodiment, determining whether the second session is compatible to replay commands from the first session includes determining whether replay is directed to the same database, a replicate, or an ancestor that is back in time, or a descendent that is forward in time, and if so whether it is safe to replay transactional and non-transactional work.

In the same or a different embodiment, determining whether the second session is compatible to replay commands from the first session includes determining whether the source and target port and versions of the server-side systems are interoperable.

In the same or a different embodiment, determining whether the second session is compatible to replay commands from the first session includes determining whether the endianness of the server-side systems are compatible and, if different but compatible, handling conversion using a universal format.

In the same or a different embodiment, determining whether the second session is compatible to replay commands from the first session includes determining the original security credentials that were used to detect and prevent tampering in the first session and, if the security credentials are different but compatible, modifying the security credentials of the second session to match the security credentials of the first session.

In the same or a different embodiment, determining whether the second session is compatible to replay commands from the first session includes determining whether the replay sequence is known, and ensuring that the replay sequence can be maintained in the second session.

In the same or a different embodiment, determining whether the second session is compatible to replay commands from the first session includes determining an identity of a last transaction submitted in the first session, and checking stored information in the database to determine whether the transaction has occurred or not in the first session, and what transaction states to restore upon continuing. In one embodiment, a transaction is blocked from completion in the first session at the same time that the transaction is determined to have not occurred in the first session, thereby ensuring that the state of the transaction is deterministic and known.

In the same or a different embodiment, determining whether the second session is compatible to replay commands from the first session includes determining whether the outcomes of every transaction in the first session are known, including local transactions, remote transactions, distributed transactions, parallel transactions, replicated transactions, XA transactions, DDL, and DCL. The outcome of a transaction may be known even though the transaction was in-flight in the first session and has not completed or rolled back. For example, a known part of the transaction may have completed and may be rolled back, and another known part of the transaction may not have yet completed and may be completed in the second session. Transactional state may span multiple replayed segments, and replay of commands may reconstruct a conversation in a session by linking these segments together.

In the same or a different embodiment, determining whether the second session is compatible to replay commands from the first session includes determining whether the calls used to build up non-transactional state over the lifetime of the application are known.

In the same or a different embodiment, determining whether the second session is compatible to replay commands from the first session includes determining whether client-visible results are available in sequential order for the first session such that the client-visible results may be compared to client-visible results generated by execution in the second session for each call replayed in the second session. In the same or a different embodiment, determining whether the second session is compatible to replay commands from the first session includes determining whether original values returned from function calls are known for the first session and whether these values may be preserved when executing commands in the second session.

In the same or a different embodiment, determining whether the second session is compatible to replay commands from the first session includes determining whether the versions of the data are compatible such that modifications between the client-visible results in the first session and in the second session may be detected.

Based on a variety of these contextual factors, the server of the second session may make the determination as to whether the second session is compatible to replay commands from the first session. If the second session is compatible, commands may be replayed, and client-visible results may be validated if they match client-visible results of command execution in the first session. Further, the contextual information that is used for comparison may be maintained at the client at a cost that is acceptable to runtime response, application throughput, and resource consumption using a design that scales. As a result, recovery and migration of in-flight work for real applications may now be achieved.

If replay is compatible, the client-visible results for each called that is replayed r in a second session is compared with the client-visible results from runtime in a first session via the checksum carried in the replay contact. If the checksums match, replay is accepted for that call, and the state of the first session has been successfully restored to the second session thus far. This process repeats as each call is replayed until all calls either match or replay is rejected because one call fails to match. The client-visible results are what the client, application, or user has seen, what the client or application may have cached, and what has been used for decisions by the client, application, and/or user. Verification logic may verify that the client-visible results from replay match the client-visible results from the original execution by determining whether the checksum at replay is the same as the checksum collected at runtime. With respect to PL/SQL global variables, if any are made available to the client, application, or user, the variables are returned to the client at runtime, and returned again at replay these are included in the checksum and hence included with the verification logic. If client-visible results are stored only on the server-side, then the client, application, or user has never seen them and they may be omitted from the checksum. Another PL/SQL sequence for same user can see these server-side results, but it doesn't matter if the server-side results are the same of different. The later submitted PL/SQL sequence runs at current time and makes the decision intended by the coder for current time, as if the request had been delayed.

Replay context may be used to provide a target system with knowledge of a source system for protection and interoperability. The replay context may provide the knowledge without exposing the client to the knowledge, and without requiring client manipulation of the data returned by the server. For example, the replay context may also use opaque SCNs to restore sessions to the original time. The replay context may also provide opaque BIND variable consistency for preserving referential integrity at replay. The replay context may also provide an opaque checksum calculation, which may be hardware-based or software-based, and immediate server-side rejection when the checksum differs. The replay context may also provide opaque optimistic locking for driver-based replay of transactions. The replay context may also provide opaque detection and rejection of LOB/BLOB/CLOB changes to support streaming of media data. The replay context may also improve the likelihood that the optimizer returns SELECT output in the same row order during replay.

Once a user request has been submitted, the replay context may give the user request a greater chance of success if replay is utilized to complete the request. An outage in one part of the system should not return an error to the end user if the outage is recoverable. Rather, if the transaction failed and is replayable, the transaction should be replayed in bounded time, and if the transaction succeeded, the successful return status should be returned to the application. Similarly, if a request containing one or more transactions (i.e., a "transactional request") failed and is replayable, then the transactional request should be replayed in bounded time. If the transactional request succeeds, the successful return status should be returned to the application. Previously, on communication, system, and site outages, errors were returned by the application regardless of the progress of the transaction or user request before the outage.

Users or applications may define a target response time for work, regardless of outages. Users or applications might or might not be tolerant of lesser service levels for outages. For business sectors such as Banking, Telecommunications, Stock Trading, Manufacturing, Transport, and Retail, degraded response times can put a system out of the market. A longer degradation can create a competitive disadvantage. The replay context can be used to improve the chances of masking database unavailability, with the restriction that commands will not be replayed beyond a time threshold, avoiding unexpected results.

In one embodiment, a database management system (DBMS) operating according to the techniques described herein is a first DBMS in the market to safely replay sessions including transactions in case of planned and unplanned outages. The DBMS may recover in-flight work following unplanned outages, migrating sessions for planned operations, rebalancing the systems when loads and topology change.

The replay context may be flexible, manageable, and minute in size to carry the knowledge that supports the fidelity of session recovery and session migration. The replay context supports validations for detecting and rejecting replay that deviated from the original execution with respect to information that the client has already seen or may have seen. Example sources that could lead to deviations between original and replayed execution include concurrency, a different database, or the original database restored, bugs, misuse, logical database changes, and environmental issues.

In one example, if a session is being replayed and a cursor replay context is provided, the original values are substituted for the function calls (if the application has granted the right to replace values), row versions are checked by the DML driver, and checksums are checked by the SQL layer. In this example, the mutable values in the cursor replay context are applied only when permissions are set to do so. Packing and unpacking of the cursor replay context may be handled at the server using the Oracle call interface (OCI) layer. In this example, if the cursor is closed on the client-side or replay has been disabled, the client driver purges the cursor replay context along with the cursor from the replay history that the client driver is holding.

In one embodiment, during replay, a top-level SQL statement is executed using the original SCN until reaching any PLSQL objects where the SCN at replay is obtained from the replay context. PLSQL may not support SCN, and the statement may be executed in current mode at current SCNs for all statements afterwards.

Example Functional Positioning of Replay Logic

In example embodiments that involve a database server, a middle-tier server with a connection manager, a client driver, and a client, replay of work following a recoverable error could be implemented at several levels of the software tier. Example forms of replay include server-based replay, driver-based replay, and WebLogic Server request replay and other Container based replay.

In a server-based replay embodiment, the replay context saves and restores non-transactional states, and saved with the UNDO segment (or similar) rather than by passing in calls and associated replay context from the client driver.

In a driver-side replay embodiment, the replay context saves and restores states used for validating protocol, database, environment, and replay fidelity that supports recovering transactional and non-transactional work. Driver-based replay may restore the server state by chronologically resubmitting SQL and PL/SQL along with the matching replay context exactly as it was issued from the client driver following a recoverable error and with resubmission within a defined time period. The client-visible state is re-established by replaying the SQL and PL/SQL issued in the same chronological order as it was submitted the first time and using the data in the replay context to, for example, ensure the replay fidelity. Time has moved forward at the server so techniques are used to ensure session replay is still valid. The server may apply the mutable values, row versioning, and checksum to ensure that touched data are the same, and the protocol checksum for validation. Driver replay may be facilitated by the replay context and transaction idempotence features.

WebLogic server based replay may be used for recovering Enterprise JavaBeans (EJB), Servlets, and http requests. WebLogic replay may repeat the application logic at the time moved forward. WebLogic replay may rely on checkpointing the http session state prior to each request. WebLogic replay may also rely on the application to unpick the changes that have been made. In one embodiment, WebLogic replay is used for well-behaved, stateless Java 2 Platform, Enterprise Edition (J2EE) applications. WebLogic based replay depends on the replay context amongst other things for security, transaction validation, and safe operation in a global system. Here the replay context is used for such things as right database, right protocol, and to block tampering.

Mutable Values Examples

In one embodiment, a server may support mutable function output by parsing commands and substituting the function result at replay with the result of the original execution. If a function's return value is cached at the client, subsequent client operations may use this value in the bind variables, calculations, or input parameters that might follow the function call. When mutable are kept, at replay the original values are returned from the supported function calls so that mismatch is avoided when the values are again used in the bind variables, calculations, or input parameters that might follow the function call. For example, if the original value returned from a seq.nextval function call is 17, at replay the same value of 17 may be returned from the server. The server uses the replay context rather than re-executing the function to preserve the referential integrity.

In one embodiment, the mutable support returns the original values from named functions, where the original values are those returned at the first submission of the function at runtime.

At first execution of a function call at runtime, the function result may be saved. In this case, the mutable value is saved in the cursor replay context area for the cursor executing and is returned to the client driver with the returned output for the SQL or PL/SQL statement in the context area. The mutable value are stored in the replay context area along with the protocol, security and validation information associated with the call.

If the SQL or PL/SQL is replayed, the cursor replay context may be passed back to the server with the replayed SQL or PL/SQL. The server recognizes that the SQL or PL/SQL are being replayed and substitutes the mutable values saved in the cursor replay context in place of re-executing the function calls. The original values are returned with the replayed SQL or to the PL/SQL. This functionality may be opaque to the client, appearing to the client as if the call executed with a slight delay.

In one embodiment, the replay context captures the mutable values of SEQUENCE.nextval, SYS_GUID, SYSDATE, and SYSTIMESTAMP, and/or DBMS_Random.

In one embodiment, SYSDATE, SYS.GUID, and [sequence name].NEXTVAL are replayed with the ORIGINAL values to promote validity of a replay of transactions. These values are selected and set during the select phase and then repeated in related bind variables. Sequence.nextval may be used for primary keys and then be bound in foreign keys, potentially in the same transaction.

SYSDATE may be used for auditing purposes, and may be cached and then bound in subsequent transactions. While, not a key, SYSDATE may be maintained at the original value, for example, in the TRANSACTION phase and optionally in the SELECT phase.

Random numbers may also be generated during runtime, such as when generating the session key at first http session creation. In one embodiment, the application may use the original cached value when the session shows FAILED_OVER, or the value may be saved in the replay context and substituted upon replay.

In one embodiment, SYSDATE is maintained as the ORIGINAL value in replayed transactions. The application may use date-time stamps as keys for transaction queue management, and the application cannot rule out that SYSDATE is repeated in the same transaction.

In one embodiment, the application binds all of LOB input directly and fetches one row at a time using the piecewise method. The application might not use DBMS_LOB or LOB locators directly in the code. Likewise, on inserts or updates, the application might not use the LOB locaters directly. The application also might not use ROWID, SYS_GUID or PL/SQL, making the driver-based replay likely to succeed.

In one embodiment, applications may use ROWID as a key to application development framework business objects in the middle tier. The ROWID may be recorded in the context and substituted as a mutable value upon replay when using the same database, same object and object version.

In one embodiment, some objects are granted mutable changes and some are not granted. For example, if a user has mutables granted, the objects inherit mutable access when the mutable functions are called. If keeping mutables on a sequence object is revoked—then SQL or PL/SQL using that object should not allow mutable collection or application for that sequence. If grants are revoked between runtime and failover, the mutables that were collected are not applied. If grants are granted between runtime and failover, mutables were not collected so none are applied.

In one embodiment, when a PL/SQL block or SQL consumes multiple mutable values during runtime, then, during replay, the nth call to get the mutable returns the nth mutable value captured. Replay continues using normal function execution if the number of mutable values captured does not match the number to be replayed. This may result in replay being rejected if the results are returned to the client as they have changed.

In one embodiment, there is one recursive replay context per SQL within the same PLSQL block, and these contexts are stored in the same order as the original execution. During replay, the hash value stored in each replay context is checked to make sure that the mutable values are replayed to the same SQL and in the same order as the original execution. In another embodiment, mutable are applied in chronological order as called so that order is strictly preserved.

Checksum, Validation, and Security Check Examples

In one embodiment, results from replay are validated by validation logic before the replay is accepted. The validation logic may be implemented on the server, the client, a middle-tier server, on a combination of these logical components to the session, or on a separate component altogether. The validation logic ensures that client-visible results are the same at replay as they were for the original submission. The client-visible results are what the user or application have seen, what the application may have cached, and what has been used for decisions by the application and by the user. If these results are the same at replay as they were at runtime, then the client-visible state has been restored to the session. This is verified by ensuring that the checksum at replay is the same as the checksum collected at runtime. The checksum is built at runtime and is saved in the replay context in case replay is attempted.

PL/SQL global variables that are accessed by the application or user are returned to the client at runtime, and either returned again or prepared to return again at replay. These variables are checked by the validation logic. If the variables are held on server-side, the user has never seen them and application has never seen them. Only another PL/SQL for same user can see them, and the verification logic might not verify whether these variables are the same of different. For these variables that were never returned to the application or user, the PL/SQL submitted during replay runs at current time and makes the decision intended by the application for the current time, as if the request was delayed.

In one embodiment, checksum logic includes all results and all information for the session, server-side and client-side, instead of just client-visible results.

In one embodiment, the checksum is accumulated for each returned trip to the client.

In one embodiment, checksum calculation is prepared at the server at runtime, and may be offloaded to hardware at the server.

In one embodiment, for checksums, the replay context is used to hold the checksum that is used to preserve that the output checksum and the protocol checksum. If the checksums have not been preserved, the session is rolled back and a replay error is returned indicating that the session is not recoverable. The client driver may purge the history and return the error to the client.

In one embodiment, at runtime, server support for checksums may offload the processing from the client to the server. Checksum calculation in the client driver may be computationally intensive; whereas using hardware support at the server may be much faster, for example, 16 times faster than in software. In one embodiment, the checksum supports the return results for all SQL and PL/SQL including SELECT, SELECT FOR UPDATE, DML RETURNING statements, ERROR TEXT and ERROR CODES, and for PL/SQL output bind variables and PL/SQL function results.

In one embodiment, at replay, the server re-calculates the checksum for the replayed result set including the rows, error messages, error codes and out binds, and compares the calculated checksum to the checksum that was preserved in the cursor replay context at original execution. If there is a mismatch, the server may return an error to the client session reporting replay rejection. The client driver may cease replay when this error is received.

A match in checksums may indicate that the same client-visible data was generated in same order or in a different order. Depending on the checksum algorithm used, it is practically sufficient that it is highly improbable that a same checksum was produced from different data. The checksum calculation may be consistent across different server-side systems to enable failover across servers with different server-side environments, whether the checksum is calculated in hardware, in software, or in a combination of hardware and software. Example algorithms for checksums include CRC-64, CRC-32, and MD-5. The CRC-64 has lower risk of collision than a CRC-32 at the cost of higher CPU consumption at runtime. The checksum can be accrued at runtime, assisted by hardware, as the byte stream is determined.

In one embodiment, a server-side interface allows checksums to be combined across buffers so a single checksum can be returned to client. The incremental accruing can be executed in hardware or software. Hardware is orders of magnitude cheaper in terms of CPU usage.

In one embodiment, a SQL layer performs the checksum calculation in the server using a checksum each per column, as a per row function, or a function that checksums a full row set before this is returned to the client.

In one embodiment, when there are multiple fetches for a cursor, the checksum for subsequent fetches is accumulated. Accumulating builds a checksum that has lower probability of collisions.

In one embodiment, a second protocol checksum is added to verify that the client replaying is whom the client should be. This protocol checksum is a combined has of the database credentials, the session LTXID (reference to transaction idempotence) and original username, plus other security invariants. The purpose of this checksum is to protect applying the replay history to another security domain or database or by another user session. The language handle or part of the compilation environment may be included in this hash, so long as it does not incur false positives.

In one embodiment, in addition to checksums, the verification logic may check row versions for SELECT statements. This could be used when the tables are queried by rowid, versus aggregates, joins and compound views. Note however, for SELECT row versions are per row rather than for the complete row set. Row versions may lead to false positives in SELECT mode if some other column was changing that is not of interest in the row set.

In one embodiment, the server may reject replay before returning results to the client if checksums mismatch for the round trip.

In one embodiment, validation detects and rejects replay that deviates from the original execution. Example sources that could lead to deviations between original and replayed execution include concurrency, row set order, bugs, misuse, and environmental issues.

In one embodiment, SSL prevents tampering with the binds and SQL on the client side and on the wire. Mutables are used to support transaction consistency, and LTXID is used to enforce at most once execution. In one embodiment, even if SSL is not in place, these structures are opaque, and neither is capable of being tampered. Tampering includes making changes, reordering information, and/or entering or substituting information in the context or to the SQL or binds being replayed. In one embodiment, these changes are detected and rejected at the server using various checksums and hash values. For each, sufficient context is added to ensure that application in the wrong domain or in the wrong manner or with the wrong SQL or in-binds is not possible.

In one embodiment, when reviewing the approaches for detection and rejection, the server offers a secure solution that prevents the client from misusing replay or forcing a bad replay, by doing the detection and rejection at the server. The approaches for detection and rejection may also involve minimal or no changes to the application, and may avoid setting complex procedures for application developers to follow.

In one embodiment, checksum is performed on the server-side to avoid code duplication among clients. A virtual operation system (VOS) layer may provide an interface for CRC64 or CRC32 computation with optional hardware support. The CPU cost may be minimized to avoid concerns about server-client offloading. If the server-side code supports failovers across servers with different endianness, checksum calculation on the server may be done after the row set is converted to a client format. A checksum algorithm on the client system might not have this constraint because it receives the converted row set.

In one embodiment, checksum calculation is performed at the row source level by applying the hash function repeatedly to the column buffers in the row vectors. An alternative approach is to perform checksum calculations at the TTC packet level. The packet may contain multiple columns in a contiguous piece of memory, and the alternative approach may reduce the number of hash function calls. However, performing the alternative approach may cause extra information to be included in the checksum, such as information (physical or logical, such as row header metadata and data type-specific header) in the packet payload that is mixed with the row data but is discarded by the client. The packet layout could be restructured such that client-visible data is packed together. Also, performing a checksum at the packet level might not be an option if the payload includes non-checksum-able data. Additionally, the hash block padding during replay could be different from the original execution, and one embodiment preserves the original padding.

In one embodiment, a checksum is not calculated for LOB, BLOB, BLOB and Secure file data types, which may be large in file size. Instead, the object incarnation may be used to determine whether the object changed between initial request and replayed request. A LOB locator may include the current database SCN. A change in the LOB data causes a change in the LOB incarnation, although the converse might not be true. To detect changes in these LOB data types between normal runtime and replay, the LOB incarnation may be used. In one embodiment, a LOB incarnation is incremented on every commit. For every LOB returned by a SQL, the LOB incarnation for the LOB stores the tuple (LOB Object ID, LOB incarnation) into the cursor replay context. In one embodiment during replay, before fetching the LOB data, the LOB incarnation is compared to the original LOB incarnation to determine whether the LOB incarnations match. Replay may be rejected in case of mismatch of either the LOB incarnation or the DBID.

In one embodiment, Natural Language Settings (NLS) are included in the checksum. In one embodiment, replay is rejected if the language settings of the original session do not match the language settings during replay. In another embodiment, the language settings are changed during replay to match the language settings of the original session.

Row Version Examples

In one embodiment, for transactions, optimistic locking allows a replayed DML operation to change the same rows as the original transaction changed. A feature called row versions is introduced to track changes to rows. In one embodiment, the row version column is added to a dictionary, starting as default null. The row version may be an actual table column as opposed to existing in the row header or block header. In one embodiment, the row version is monotonically increasing at each DML stage. The row version may be increased as part of the DML if there is no change to commit. The row version may be user selectable but does not appear in the statement, "select *". In one embodiment, the row version differs from the row SCN and the DML update time in time of update and immunity to date changes.

This row version feature can be used to improve concurrency by not locking rows in exclusive mode that an application might change but rather using an optimistic locking approach. Instead, in one example, the application selects the row id, row versions in every SELECT issued by the application relating to DML, and every DML includes the row version in the subsequent update or delete statement, comparing the original to the current. The DML returns no rows if the row version has been changed between the SELECT and DML execution.

Driver replay may also use optimistic locking to ensure that rows that were changed by the original DML operation—updates and deletes—are the same rows that were touched by the original DML. This is used to avoid lost updates or deletes, should a subsequent DML execute between the original and the replay.

In one embodiment, applications are reconfigured to use row versions. In another embodiment, the row versions are stored in the replay context. With row versions enabled, the original DML can return rowid/row version pairs in the replay context in a manner that does not affect operation of the application. At replay, the DML driver can check that the session is in replay and has passed back the replay context containing the rowid/row version pairs that are validated as matching. The replay context provides a mechanism to save and return the keys that are used for protecting transaction replay.

In one embodiment, replayable objects are objects that are protected by versioning so that replay cannot lose updates. A replayable object may have row versions active and replay protection through the cursor replay context and DML driver.

In one embodiment, the optimistic locking is based on the row version feature. The original rowid/row version pairs are saved in the cursor replay context and are compared at replay to ensure that the DML matches.

In one embodiment, on first DML execution (update or delete), for a replayable object, the data layer passes the before images of the rowid and row version tuples back to the SQL layer. A callback may be added to pass the before image tuples from data later to SQL later at update and delete for rowid/row version.

In one embodiment, at replay of the same DML, this same rowid/row version set is returned to the DML driver from the SQL layer. If any row at replay mismatches (more rows, fewer rows, different row versions)—the DML driver returns an error and replay is aborted.

In one embodiment, the DML driver rejects replay if some tables do not have row versions, or are otherwise not defined as replayable.

In one embodiment, although a rowid uniquely identifies a row in a table, the rowid might change its value if the underlying table is an index organized table or a partitioned table. Also, rowids change if a table is exported and imported using EXP/IMP or is rebuilt using Golden Gate or Logical Standby. If rowids are stored away for later re-use, the corresponding row might either not exist or contain completely different data. In a replay driver embodiment, the ROWID is held and resubmitted. This is valid if the submission is against the same database and the object was not reorganized.

Optimizer Plan Examples

In one embodiment, to promote replay success, rows are returned to the client in the same order at replay as the original execution. This may prevent the client from seeing rows that it has already seen and potentially used in other logic. The order of rows returned may be forced even for circumstances where the order is non-deterministic at runtime. That is, order may be forced for SELECT or SELECT FOR UPDATE with no ORDER BY clause.

In one embodiment, fetch order is strictly preserved when the statistics or environment for replay are different from the original such that a different environment does not cause different ordering.

In one embodiment, the optimizer plan is compressed and saved with the cursor in the cursor replay context. The same plan may be used at failover than was used at original execution.

In one embodiment, the checksum calculation is sensitive to the ordering of rows and can lead to unnecessary rejections if the client SQL commands do not have a ORDER BY clause. In one embodiment, cursor replay is insensitive to row ordering such that misordering does not cause an unnecessary rejection.

In one embodiment, in order to improve the likelihood of getting the same order of rows as the original query, the cursor compilation environment and plan outline are stored in the replay context so that a new child cursor may be created to have the same execution plan as original. The cursor compilation environment may be fixed at, for example, 212 bytes, and the plan outline may be approximately 300 bytes for a simple SQL such as "select * from scott.emp". The execution plan outline text hints may also be captured into the replay context during post processing of query structure allocations.

During replay, in one embodiment, the server uses a new sharing criterion that compares the captured compilation environment and outline hints against the ones stored in the existing child cursor. If there is not an existing child cursor that matches, a new child cursor may be built to match the captured compilation environment and outline hints. The original compilation environment may be prefilled into the child cursor during replay at the beginning of cursor compilation. The plan outline hints may then be reapplied during replay when the cursor is parsed before generating the execution plan. In one embodiment, the execution plan optimization option causes serialization and de-serialization of the structures, and this option may be turned on or off by the client and/or server.

Example Infrastructure

In one embodiment, the cursor replay context carries a version to allow changes across releases. The cursor replay context may be returned to and received from an earlier version of the database. For example, if two databases are used for failover, and one is operating at version 5 and the other is operating at version 8, the later version may be configured to be capable of reading the earlier version.

In one embodiment, the cursor replay context is returned on each round trip to the client. The cursor replay context may be opaque so that it can be added and changed readily without reconfiguration of the applications. In other words, the client need not look inside the replay context, and the replay context might not require any APIs for packing and unpacking the context on the client side.

In one embodiment, there is one or more cursor replay context per cursor at the client. Order of the cursor replay context may be important per cursor.

In one embodiment, the client driver sends the cursor replay contexts back for each replayed execution. The client driver may send all cursor replay contexts associated with a cursor at once or may send one per round trip. The client may also send all replay context for all cursors together, or incrementally with each associated cursor.

In one embodiment, when a cursor has multiple fetches associated with it, the driver has the option to send all cursor replay context for that cursor at the first execution and to fetch all rows at this time.

In one embodiment, when replaying, the call will return an error to the client if the cursor replay checks fail.

If the checks return an error to the client, in one embodiment, the cursor is closed on the server side and the session is rolled back. In one embodiment, if cursor replay checks fail, the non-transactional session state may be lost, and the session is aborted by both the server and client.

Example Bytestream Format

An example bytestream format of the replay context is provided in the following table:

| Byte number | 0-1 | 2-3 | 4-5 | 6-7 | 8-9 | 10-11 | | |
|---|---|---|---|---|---|---|---|---|
| value | 8-bit flag, leftmost bit is Endianness | Protocol Version | Structure ID | Structure Version | Structure Size | Mandatory or Optional | Structure Content | Structure ID | — |

The example byte-stream begins with endianness and protocol version for quick compatibility checks. Then, the byte-stream is followed by a list of (structure ID, structure version, structure size, structure content). In one embodiment, structure size is limited to 64K. If the mutable structure size is greater than 64K, then the mutable structure will not be supplied for replay in this embodiment. In one embodiment, replay is rejected if the mandatory field is set to true and one of the following conditions are met: Structure ID is unknown, or Structure ID is known but version or size do not match the local database.

Example Validation Hash

In one embodiment, before the cursor replay context is used for replay, verification logic validates that the hash value of the SQL statement matches the one stored in the replay context.

During the original execution, the current environment of the server session may be hashed and stored in the context. Here is an example list of values that may be included in the hash: logical transaction identifier (LTXID), database identifier (DBID), User name, Schema name, database character set, two-task common (TTC) sequence number, Two-Task Interface (TTI) bits, and Endianess.

During replay, the current environment, including NLS handle and security information may be hashed again, and the verification logic verifies whether the resulting hash value matches the hash value that was computed during runtime. Replay is rejected if any of the two hash values mismatch. MD5 hashing algorithm may be used. The protocol version is bumped if a new hashing algorithm is used. The hash values may exclude some settings such as optimizer and events, as long as the client-visible results are the same.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
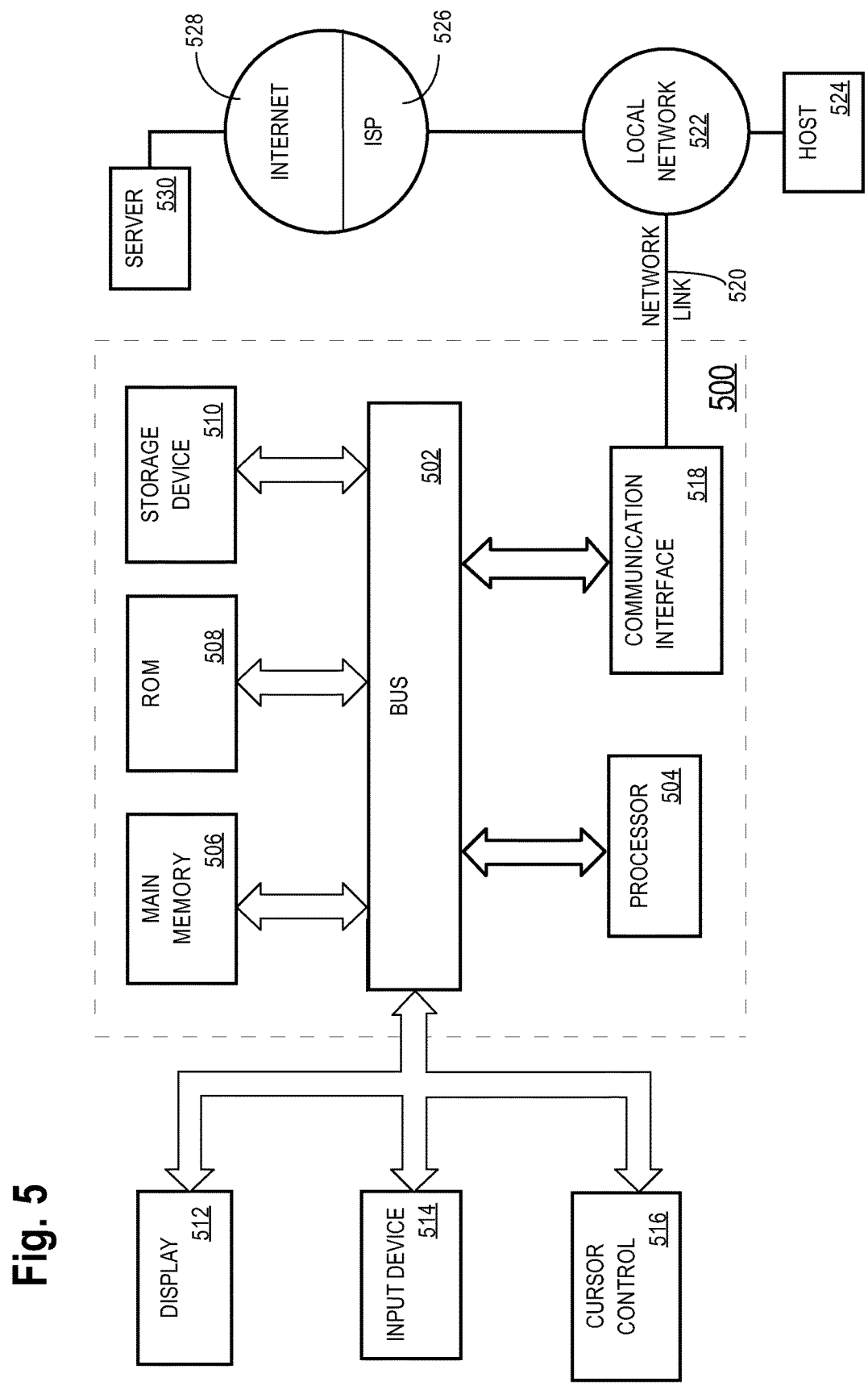
FIG. 5 illustrates an example computer system that may be specially configured to perform example methods described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    a client machine storing one or more commands of a set of commands that were sent for execution in a first server-client session, wherein the first server-client session is distinguished from one or more other server-client sessions by one or more items of server-side environment information;
    the client machine sending the one or more commands and the one or more items of server-side environment information in a second server-client session, wherein, before receiving the one or more items of server environment information, the second server-client session differs from the first server-client session with respect to at least one of the one or more items of server environment information.

2. The method of claim 1, further comprising:
    the client machine detecting unavailability of the first server-client session;
    wherein sending the one or more commands and the one or more items of server-side environment information is performed by the client machine in response to detecting the unavailability of the first server-client session.

3. The method of claim 1, wherein the second server-client session is compatible with the one or more items of server-side environment information, further comprising the client machine receiving an indication that the one or more commands were successfully completed in the second server-client session.

4. The method of claim 1, wherein the second server-client session is incompatible with the one or more items of server-side environment information, further comprising receiving an indication that the one or more commands were not successfully completed in the second server-client session.

5. The method of claim 1, wherein the one or more items of server-side environment information comprise one or more characteristics of server-side hardware used in the first server-client session.

6. The method of claim 1, wherein the one or more items of server-side environment information comprise one or more characteristics of server-side software used in the first server-client session.

7. The method of claim 1, further comprising:
    the client machine receiving, in the first server-client session, the one or more items of server-side environment information in response to the one or more commands of the set of commands that were sent for execution in the first server-client session;
    wherein the client machine sending, in the second server-client session, the one or more items of database server-side environment information comprises the client machine sending the one or more items of server-side environment information received in the first server-client session, without modification by the client machine.

8. The method of claim 1, wherein the one or more items of server-side environment information received are appended to one or more messages received by the client machine in response to execution of the one or more commands in the first server-client session.

9. The method of claim 1, wherein the one or more items of server-side environment information comprise protocol ordering information such that a command issued from the client is accepted or rejected for execution in the second server-client session.

10. The method of claim 1, wherein the one or more items of server-side environment information comprise one or more characteristics of server-side state that allows the second server-client session to be built to a same state that the first server-client session was built.

11. The method of claim 1, wherein the one or more items of server-side environment information comprise one or more characteristics of the data returned from command execution in the first server-client session that allows validation of data returned from command execution in the second server-client session.

12. A method comprising:
a server machine in a second server-client session receiving, from a client:
one or more items of server-side environment information for a first server-client session on which a set of commands was previously sent for execution; and
one or more commands of the set of commands for execution in the second server-client session;
in response to receiving the one or more items of server-side environment information, the server machine determining whether or not the server machine is compatible with the one or more items of server-side environment information before starting to execute the one or more commands in the second server-client session.

13. The method of claim 12, wherein the one or more items of server-side environment information comprise one or more characteristics of hardware used in the first server-client session.

14. The method of claim 12, wherein the one or more items of server-side environment information comprise one or more characteristics of software used in the first server-client session.

15. The method of claim 12, further comprising:
in response to determining that the second server-client session is incompatible with the one or more items of server-side environment information, the server machine indicating, to the client, that the first server-client session cannot be restored on the second server-client session.

16. The method of claim 12, further comprising:
in response to determining that the first server-client session is compatible with the one or more items of server-side environment information, the server machine executing the one or more commands in the second server-client session, and using the one or more items of server-side environment information to validate a result of the one or more commands in the second session.

17. The method of claim 16, further comprising:
verifying that second client-visible results of executing the one or more commands in the second server-client session match first client-visible results of executing the set of commands in the first server-client session when the one or more commands are executed; and
if the second client-visible results do not match the first client-visible results, the server machine indicating, to the client, that the first server-client session cannot be restored on the second server-client session.

18. The method of claim 12, wherein the one or more items of server-side environment information were appended to one or more messages sent to the client in response to execution of the set of commands in the first server-client session.

19. The method of claim 12, wherein the one or more items of server-side environment information include one or more of: an identity of an underlying database of the first server-client session, a type of the underlying database of the first server-client session, a logical state or time of the underlying database of the first server-client session, a hardware platform that is used for the first server-client session, endianness or other storage format characteristics for the first server-client session, a session state signature or hash used to determine that session state is correct for replay, security credentials used for the first server-client session, protocol information to ensure that execution in the second server-client session is in a correct order, original values that were returned from function calls in the first server-client session, versions of data against which commands were executed in the first server-client session, and an optimizer execution plan that preserves an output order of commands in the first server-client session.

20. The method of claim 12, wherein the one or more items of server-side environment information comprise one or more characteristics of server-side state that allows the second server-client session to be built to a same state that the first server-client session was built.

21. The method of claim 12, wherein the one or more items of server-side environment information comprise one or more characteristics of the data returned from command execution in the first server-client session that allows validation of data returned from command execution in the second server-client session.

22. One or more non-transitory storage media storing instructions which, when executed by one or more computing devices, cause performance of:
a server machine in a second server-client session receiving, from a client:
one or more items of server-side environment information for a first server-client session on which a set of commands was previously sent for execution; and
one or more commands of the set of commands for execution in the second server-client session;
in response to receiving the one or more items of server-side environment information, the server machine determining whether or not the server machine is compatible with the one or more items of server-side environment information before starting to execute the one or more commands in the second server-client session.

23. The one or more non-transitory storage media of claim 22, wherein the one or more items of server-side environment information comprise one or more characteristics of hardware used in the first server-client session.

24. The one or more non-transitory storage media of claim 22, wherein the one or more items of server-side environment information comprise one or more characteristics of software used in the first server-client session.

25. The one or more non-transitory storage media of claim 22, wherein the instructions, when executed, further cause performance of:
in response to determining that the second server-client session is incompatible with the one or more items of server-side environment information, the server machine indicating, to the client, that the first server-client session cannot be restored on the second server-client session.

26. The one or more non-transitory storage media of claim 22, wherein the instructions, when executed, further cause performance of:
in response to determining that the second server-client session is compatible with the one or more items of server-side environment information, the server machine executing the one or more commands in the second server-client session.

27. The one or more non-transitory storage media of claim 26, wherein the instructions, when executed, further cause performance of:

verifying that first client-visible results of executing the set of commands in the first server-client session match second client-visible results of executing the one or more commands in the second server-client session when the one or more commands are executed; and if the first client-visible results do not match the second client-visible results, the server machine indicating, to the client, that the first server-client session cannot be restored on the second server-client session.

28. The one or more non-transitory storage media of claim 22, wherein the one or more items of server-side environment information were appended to one or more messages sent to the client in response to execution of the set of commands in the first server-client session.

29. The one or more non-transitory storage media of claim 22, wherein the one or more items of server-side environment information include one or more of: an identity of an underlying database of the first server-client session, a type of the underlying database of the first server-client session, a logical state or time of the underlying database of the first server-client session, a hardware platform that is used for the first server-client session, endianness or other storage format characteristics for the first server-client session, a session state signature or hash used to determine that session state is correct for replay, security credentials used for the first server-client session, protocol information to ensure that execution in the second server-client session is in correct order, original values that were returned from function calls in the first server-client session, versions of data against which commands were executed in the first server-client session, and an optimizer execution plan that preserves an output order of commands in the first server-client session.

30. The one or more non-transitory storage media as recited in claim 22, wherein the one or more items of server-side environment information comprise one or more characteristics of server-side state that allows the second server-client session to be built to a same state that the first server-client session was built.

31. The one or more non-transitory storage media as recited in claim 22, wherein the one or more items of server-side environment information comprise one or more characteristics of the data returned from command execution in the first server-client session that allows validation of data returned from command execution in the second server-client session.

32. One or more non-transitory storage media storing instructions which, when executed by one or more computing devices, cause performance of:

a client machine storing one or more commands of a set of commands that were sent for execution in a first server-client session, wherein the first server-client session is distinguished from one or more other server-client sessions by one or more items of server-side environment information;

the client machine sending the one or more commands and the one or more items of server-side environment information in a second server-client session, wherein, before receiving the one or more items of server environment information, the second server-client session differs from the first server-client session with respect to at least one of the one or more items of server environment information.

33. The one or more non-transitory storage media of claim 32, wherein the instructions, when executed by one or more computing devices, further cause performance of:

the client machine detecting unavailability of the first server-client session;

wherein sending the one or more commands and the one or more items of server-side environment information is performed by the client machine in response to detecting the unavailability of the first server-client session.

34. The one or more non-transitory storage media of claim 32, wherein the second server-client session is compatible with the one or more items of server-side environment information, further comprising the client machine receiving an indication that the one or more commands were successfully completed in the second server-client session.

35. The one or more non-transitory storage media of claim 32, wherein the second server-client session is incompatible with the one or more items of server-side environment information, further comprising receiving an indication that the one or more commands were not successfully completed in the second server-client session.

36. The one or more non-transitory storage media of claim 32, wherein the one or more items of server-side environment information comprise one or more characteristics of server-side hardware used in the first server-client session.

37. The one or more non-transitory storage media of claim 32, wherein the one or more items of server-side environment information comprise one or more characteristics of server-side software used in the first server-client session.

38. The one or more non-transitory storage media of claim 32, wherein the instructions, when executed by one or more computing devices, further cause performance of:

the client machine receiving, in the first server-client session, the one or more items of server-side environment information in response to the one or more commands of the set of commands that were sent for execution in the first server-client session;

wherein the client machine sending, in the second server-client session, the one or more items of database server-side environment information comprises the client machine sending the one or more items of server-side environment information as received in the first server-client session, without modification by the client machine.

39. The one or more non-transitory storage media of claim 32, wherein the one or more items of server-side environment information received are appended to one or more messages received by the client machine in response to execution of the one or more commands in the first server-client session.

40. The one or more non-transitory storage media of claim 32, wherein the one or more items of server-side environment information comprise protocol ordering information such that a command issued from the client is accepted or rejected for execution in the second server-client session.

41. The one or more non-transitory storage media of claim 32, wherein the one or more items of server-side environment information comprise one or more characteristics of server-side state that allows the second server-client session to be built to a same state that the first server-client session was built.

42. The one or more non-transitory storage media of claim 32, wherein the one or more items of server-side environment information comprise one or more characteristics of the data returned from command execution in the first server-client session that allows validation of data returned from command execution in the second server-client session.

* * * * *

UNITED STATES PATENT AND TRADEMARK OFFICE
CERTIFICATE OF CORRECTION

PATENT NO. : 9,600,371 B2  
APPLICATION NO. : 13/542278  
DATED : March 21, 2017  
INVENTOR(S) : Colrain et al.

It is certified that error appears in the above-identified patent and that said Letters Patent is hereby corrected as shown below:

On the Title Page

On page 2, Column 2, under Other Publications, Line 16, delete "Allownace," and insert
-- Allowance, --, therefor.

In the Specification

In Column 17, Line 58, delete "the the" and insert -- the --, therefor.

In Column 24, Line 46, delete "as a" and insert -- as --, therefor.

In Column 29, Line 25, delete "Endianess." and insert -- Endianness. --, therefor.

In the Claims

In Column 36, Line 39, in Claim 38, after "information" delete "as".

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*